United States Patent [19]

Oiwa

[11] Patent Number: 4,512,664
[45] Date of Patent: Apr. 23, 1985

[54] INTERNAL MIXER

[75] Inventor: Isao Oiwa, Kobe, Japan

[73] Assignee: Sumitomo Rubber Industries, Ltd., Hyogo, Japan

[21] Appl. No.: 576,427

[22] Filed: Feb. 2, 1984

[30] Foreign Application Priority Data

Feb. 7, 1983 [JP] Japan .................. 58-19430

[51] Int. Cl.³ .............................. B29B 5/02
[52] U.S. Cl. .................... 366/76; 141/258; 366/183
[58] Field of Search .......... 366/76, 150, 183; 425/201, 204, 583, 585; 141/258; 100/226; 222/404

[56] References Cited

U.S. PATENT DOCUMENTS 2,446,657  8/1948  MacLeod et al. ............ 366/76
3,572,645  3/1971  Matsuoka ..................... 366/76

Primary Examiner—Philip R. Coe
Attorney, Agent, or Firm—Birch, Stewart, Kolasch & Birch

[57] ABSTRACT

A mixing of mixing machine comprises a mixer body having a mixing chamber and a material inlet through which a material to be mixed is loaded into the chamber, a fluid-operated cylinder having a piston rod on which a floating weight is mounted for movement together with the piston rod between lifted and lowered positions, a support structure for supporting the cylinder for movement between an operative, in which the floating weight is in register with the material inlet, and a stand-by position in which the cylinder with the floating weight held in the lifted position is located laterally offset with respect to the material inlet, and a drive mechanism for moving the cylinder between the operative and stand-by positions.

4 Claims, 4 Drawing Figures

INTERNAL MIXER

BACKGROUND OF THE INVENTION

The present invention relates to an internal mixer for mixing and/or kneading materials together.

An internal mixer of a type to which the present invention pertains generally comprises, as shown in FIG. 1 of the accompanying drawings, a mixer body or casing 1 having a generally epitrochoidal mixing chamber 5 with a pair of rotors 6 drivingly housed therein, an upright chute or hopper 2 upstanding from top of the mixer body 1 with its interior communicated with the mixing chamber 5 for the supply of a material to be mixed into the mixing chamber 5, and a floating weight 4 supported within the hopper 2 for movement between lifted and lowered positions and operable to urge the material to be mixed, which has been introduced in a predetermined quantity into the hopper 2 through a supply gate 3, towards the mixing chamber 5 as it is driven from the lifted position towards the lowered position and at the same time to close the opening leading from the interior of the hopper 2 to the mixing chamber 5. The material loaded into the mixing chamber 5 in the manner described above is uniformly mixed when the rotors 6 are driven in the opposite directions with respect to each other, and after it has been mixed uniformly, the mixed material is discharged exteriorly of the mixing chamber 5 by opening a drop-out door 7 arranged and supported at a lower region of the mixer body 1. In this prior art internal mixer, the floating weight 4 must be imparted a cushioning effect in its direction of movement in order for a good mixing result to be obtained.

According to the prior art, as an actuator for the floating weight 4, a pneumatic cylinder 8 is utilized as mounted on the top of the hopper 2 in axial alignment therewith while a piston member 9 inside the cylinder 8 is operatively coupled to the floating weight 4 through a piston rod 10, such that when compressed air is introduced into and purged out from the cylinder chamber 11, one at a time, the floating weight 4 can be moved from the lifted position towards the lowered position and from the lowered position towards the lifted position, respectively.

With the above described prior art internal mixer, it has been found that, since a large amount of air is necessarily discharged to the atmosphere when the floating weight 4 is moved to the lifted position in readiness for the supply of the material to be mixed into the hopper 2 through the gate 3, a loss of energy is too great. Because of this, a compressor of relatively large displacement has to be operated for a substantially extended period of time, and this tends to pose another problem in that a high running cost is incurred.

In addition, the cylinder 8 upstanding on the top of the hopper 2, must have a great stroke for the movement of the piston member 9 in order for the floating weight 4 to be moved within the hopper 2 over substantially the entire length thereof, resulting in the increased height of the machine as a whole. This, in turn, requires a high-roofed or high-raise building for the accommodation of the mixing machine, and therefore, the installation of such a prior art mixing machine is accompanied by the increased cost for the construction of the building.

SUMMARY OF THE INVENTION

Accordingly, the present invention has been developed with a view to substantially eliminating the above described disadvantages inherent in the prior art mixing machine and has for its essential object to provide an improved mixing machine which is small in height and can, therefore, be installed within any existing factory building.

Another important object of the present invention is to provide an improved mixing machine of the type referred to above, which does not substantially involve an increased running cost as well as the increased cost in constructing a building for the accommodation of the machine.

According to the present invention, the above described objects can be accomplished by making the cylinder for driving the floating weight movable between an operative position in which the floating weight is positioned immediately above the material inlet leading to the mixing chamber, and a stand-by position in which the cylinder together with the floating weight is laterally displaced to clear the passage through which the material supplied into the chute falls downward towards the material inlet.

The machine may also be equipped with a partition wall member to define a portion of the chute in cooperation with the surrounding walls only when the cylinder with the floating weight held in the lifted position is moved to the stand-by position.

With the present invention, the cylinder for driving the floating weight may have a length substantially shorter than that hitherto employed in the prior art machine, has is the height of the machine as a whole.

BRIEF DESCRIPTION OF THE DRAWINGS

These and other objects and features of the present invention will become clear from the following description taken in conjunction with a preferred embodiment thereof with reference to the accompanying drawings, in which.

DETAILED DESCRIPTION OF THE EMBODIMENT

Figure 1:
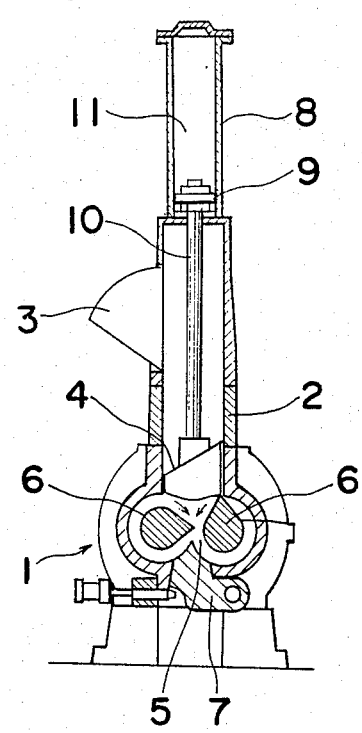
FIG. 1 is a longitudinal sectional view of a prior art internal mixing machine.
Figure 2:
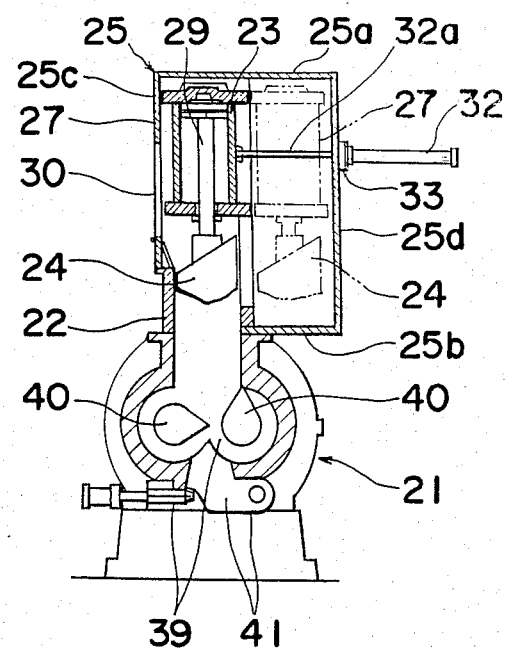
FIG. 2 is a schematic longitudinal sectional view of a internal mixing machine embodying the present invention.
Figure 4:
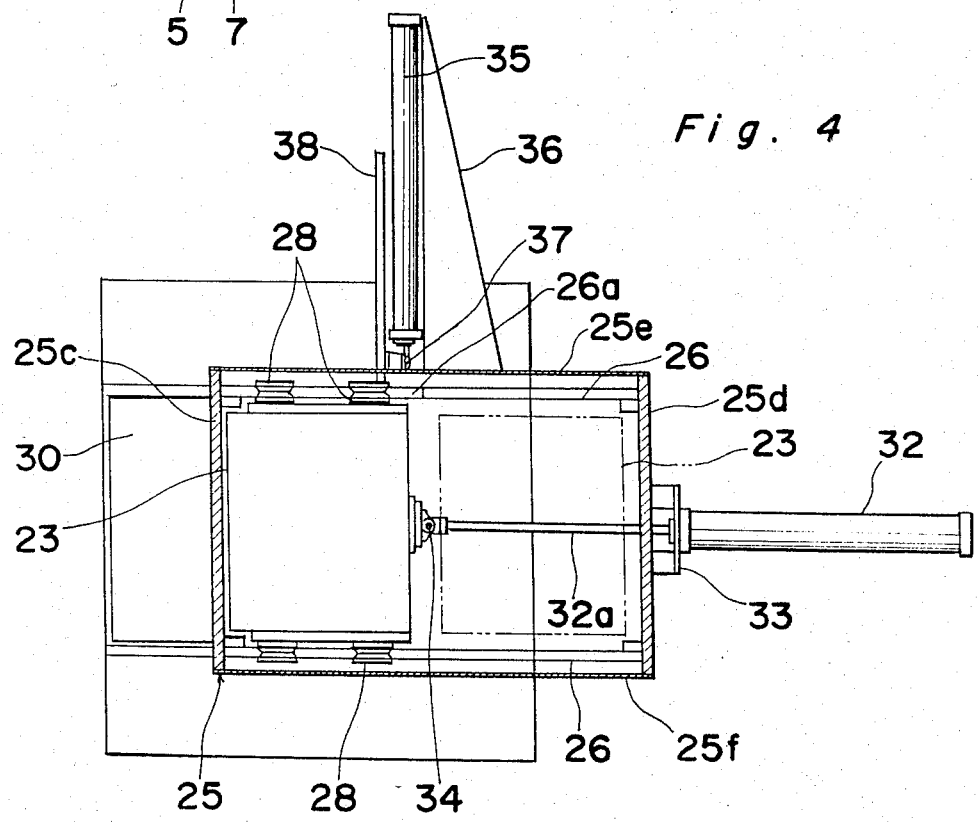
FIG. 4 is a sectional view of the machine shown in FIG. 3, as viewed from top.
Figure 3:
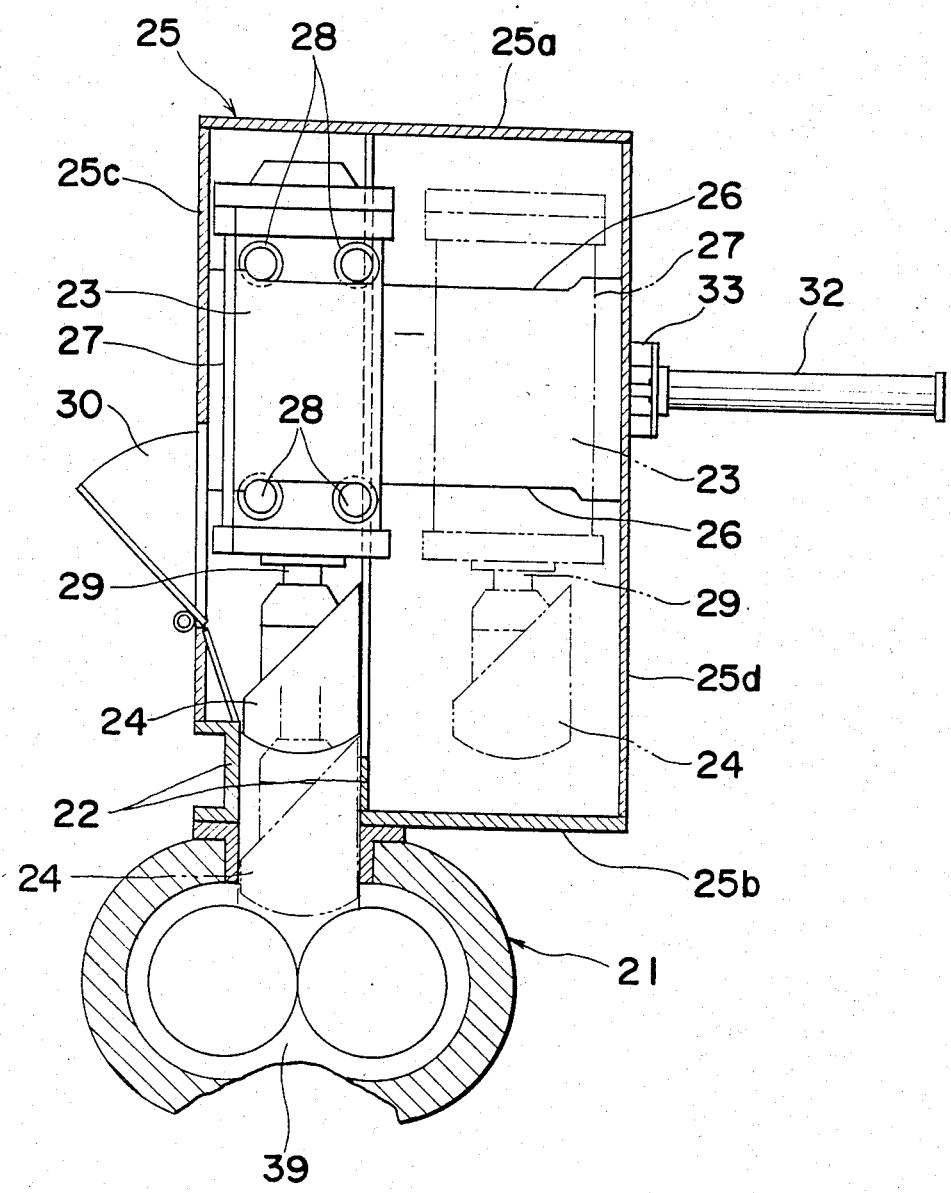
FIG. 3 is a view similar to FIG. 2, showing an essential portion of the machine on an enlarged scale.

Referring now to FIGS. 2 and 4, an internal mixing machine embodying the present invention comprises a mixer body or casing 21 of any known construction having a generally epitrochoidal mixing chamber 39 defined therein and in which a pair of rotors 40 are drivingly housed for mixing a material loaded therein in a manner as will be described later. As is the case with the mixer body of the prior art mixing machine, the mixer body 21 is rigidly mounted on a bench above the floor or any other suitable support surface with a drop-out door 41 confronting a discharge opening in the bench. The mixer body 21 has a material inlet defined therein in opposition to the drop-out door 41 and has rigidly mounted thereon a hopper 22 extending upwards in alignment with the material inlet. The hopper 22 has a short length sufficient to, and is operable, to prevent a floating weight 24, as will be described later, from undergoing an arbitrary motion about its own longitudinal axis and/or in a direction laterally of the longitudinal axis thereof during the mixing operation with the floating weight 24 held in a lowered position, which arbitrary motion would otherwise be induced in correspondence with the behavior of the material being actually mixed within the mixing chamber 39.

Rigidly mounted on the hopper 22 which may be an integral part of the casing for the mixer body 21 is a frame structure 25 comprised of top and bottom walls 25a and 25b, front and rear walls 25c and 25d, and a pair of opposed side walls 25e and 25f, all fabricated into a generally box-like configuration. The frame structure 25 accommodates therein a pair of generally strip-shaped robust guide rails 26 rigidly connected at their opposite ends to the front and rear walls 25c and 25d and extending therebetween in parallel to and adjacent the respective side walls 25e and 25f, it being noted that one of the guide rails 26 is discontinued at a substantially intermediate portion to define a clearance 26a for the passage of a back door 38 in a direction transversely of the discontinued guide rail 26 as will become apparent from the subsequent description. In any event, it will readily be seen from the foregoing that each of the guide rails 26 should be of a construction capable of withstanding a force tending to urge it upwardly in correspondence with the behavior of the material being kneaded within the mixing chamber 39.

A pneumatic cylinder 23 for driving the floating weight 24 between lifted and lowered positions in a direction away from and close to the mixing chamber 39 is enclosed in a casing 27 of generally rectangular or square cross-sectional shape as shown in FIG. 4, which is in turn mounted on the guide rails 26 by means of upper and lower pairs of rollers generally identified by 28. These upper and lower pairs of rollers 28 are rotatably carried by the cylinder casing 27, one upper pair of the rollers and one lower pair of the rollers being held in position to substantially sandwich one of the guide rails 26 while the other upper pair of the rollers and the other lower pair of the rollers are held in position to substantially sandwich the other of the guide rails 26. It is to be noted that, in view of the fact that the guide rail 26 adjacent the back door 38 is discontinued for the passage of the back door 38 therethrough, the number of the rollers of the upper pair resting on the discontinued guide rail is preferably three for stabilizing the movement of the cylinder 23 or the cylinder casing 27. The cylinder 23 so supported is movable between an operative position shown by the solid line and a stand-by position shown by the phantom line in a direction parallel to the guide rails 26 and in a direction perpendicular to the direction of movement of the floating weight 24.

For moving the cylinder 23 in the manner described above, a fluid-operated cylinder 32, either a pneumatic or a hydraulic cylinder, is secured exteriorly to the rear wall 25d of the frame structure 25 by means of a mount 33 with its piston rod 32a extending through the rear wall 35d and pivotally connected to the cylinder casing 27 by means of a clevice 34.

The cylinder 23 has a piston rod 29 extending outwardly from the casing 27 and carrying the floating weight 24. The floating weight 24 serves not only to load the material to-be-kneaded, which has been supplied through a gate 30 defined in the front wall 25c, into the mixing chamber 39 as it moves from the lifted position towards the lowered position, but also to close the material inlet in the mixer body 21 to confine the material within the mixing chamber 39 during the mixing operation with the floating weight 24 held in the lowered position as shown by the phantom line in FIG. 4.

In the construction so far described, it may happen that the material supplied into the gate 30 may, depending on the type of the material to be mixed or mixed, scatter onto an area of the bottom wall 25b corresponding to the stand-by position for the cylinder 23. According to another feature of the present invention, this possibility can be eliminated by the provision of the back door 38 supported for movement into and out of the frame structure 25 by means of a fluid-operated cylinder 35. For this purpose, the side wall 25e has a generally elongated opening defined therein in alignment with the clearance 26a in the guide rail 26 for the passage of the back door 38.

The movement of the back door 38 into and out of the frame structure 25, that is, between closed and opened positions, is effected by a fluid-operated cylinder 35 rigidly mounted on a bracket 36 secured to the side wall 25e and having its piston rod pivotally connected to the back door 38 by means of a joint 37. While the back door 38 is shown in FIG. 4 as held in the opened position because of the cylinder 23 held in the operative position (the solid-lined position), the back door 38 when moved to the closed position confronts the front wall 25c so as to define a chute in cooperation with the walls 25c, 25e and 25f, which chute is continued to and aligned with the hopper 22.

Although not shown, for detecting the position of each of the cylinders 23, 32 and 35, the machine is provided with limit switches or similar position detectors for sequentially controlling electromagnetic valves to bring the cylinders into operation sequentially. While the electro-mechanical circuit for the sequential control of the cylinders will not be described in detail since it does not constitute the subject matter of the present invention, they are operatively associated with each other so as to generally follow the following sequence.

Assuming that the mixing chamber 39 is empty, and at the time the material to be mixed is ready to be supplied into the gate 30, the floating weight 24 is in the lifted position with the cylinder 23 held in the stand-by position and the back door 38 held in the closed position. In this condition, the back door 38 in the closed position forms a partition wall dividing the interior of the frame structure 25 into two compartments; one serving as the chute and the other accommodating the cylinder 23 with the floating weight 24.

After the material has been supplied into the mixing chamber 39 through the gate 30 and the hopper 22, and when the gate 30 is subsequently pivoted to close the opening in the front wall 25c, the back door 38 in the closed position is moved out of the frame structure 25 towards the opened position by the cylinder 35 and, at the same time, the cylinder 23 with the floating weight is moved towards the operative position by the cylinder 32. Upon arrival of the cylinder 23 at the operative position, the floating weight 24 is lowered by the cylinder 23 to compress or urge the material to-be-mixed into the mixing chamber 39. Simultaneously therewith, the rotors 40 are driven to perform the mixing operation in a manner known to those skilled in the art.

After the completion of the mixing operation, the rotors 40 are brought to a halt and the drop-out door 41 is opened to allow the discharge of the mixed material out of the mixing chamber 39. After the attendant worker has confirmed the discharge of the mixed material and then closed the drop-out door 41, a reverse switch has to be actuated to operate the cylinder 23 so as to lift the floating weight 24 towards the lifted position located adjacent the gate 30. In response to the arrival of the floating weight at the lifted position, the cylinder 23 within the casing 27 is moved from the operative position towards the stand-by position by the cylinder 32 and the back door 38 is subsequently brought to the closed position by the cylinder 35.

From the foregoing description, it has now become clear that, since the floating weight used in the machine of the present invention need not be lifted upwardly to such an extent as to sufficiently clear the opening leading to the hopper, but is sufficient to be upwardly lifted some short distance from the top opening of the hopper 22, at the time of the supply of the material into the chute, not only can the height of the machine as a whole be advantageously minimized, but also the increase of the running cost which would result from the need of a relatively large amount of compressed air such as in the prior art machine can be avoided.

For a given mixing result, the machine according to the present invention can employ the pneumatic cylinder 23, 558.8 mm in internal diameter, 485 mm in stroke and 127 mm in diameter of the piston rod, whereas the prior art machine employs the pneumatic cylinder 8, 558.8 mm in inner diameter, 1485 mm in stroke and 127 mm in diameter of the piston rod. Since the stroke of movement of the piston rod 29 in the cylinder 23 employed according to the present invention is shorter than that in the prior art machine by more than 1 m, the length of the cylinder 23 itself may be correspondingly shorter than that in the prior art machine. Therefore, the building in which the machine according to the present invention is to be installed may have a height lower than that in which the prior art machine is installed, by about two meters or more corresponding to the sum of the length of the cylinder and the stroke of the piston rod, and thus the cost incurred in constructing the building can also be minimized. In addition, the machine according to the present invention can also be installed in any existing low-roofed factory building.

Although the present invention has been fully described in connection with the preferred embodiment thereof with reference to the accompanying drawings, it is to be noted that various changes and modifications are apparent to those skilled in the art. By way of example, the drive mechanism for the back door, though described as comprised of the fluid-operated cylinder 35, may comprise a combination of a rack secured to the back door with a pinion gear coupled to an electric motor and engaged to the rack. Similarly, the drive mechanism for the cylinder 23, though described as comprised of the fluid-operated cylinder 32, may comprise a screw drive coupled with an electric motor. In any event, two drive mechanisms may be employed for moving the cylinder 23 between the operative and stand-by positions.

In addition, instead of the employment of the rollers 28, metal slides and/or bearings may be employed.

Furthermore, instead of the employment of the back door and the associated drive mechanism, a plate similar in shape and size to the back door 38 or the front wall 25c may be secured to the surface of the casing 27, which confronts the front wall 25c, for movement together with the cylinder 23 so that, when the cylinder 23 is in the stand-by position, the plate can be spaced from the front wall 25c to define the chute.

Yet, although reference has been made to the mixing machine, the machine may be used as a mixer, i.e., for the purpose of mixing a material uniformly, and therefore the term "kneader" is to be construed as interchangeable with "mixer".

Accordingly, unless such changes and modifications depart from the scope of the present invention as defined by the appended claims, they are to be understood as included therein.

What is claimed is:

1. A machine for mixing a material which comprises:
   a mixer body having a mixing chamber defined therein and accommodating therein at least one rotor for mixing the material within the mixing chamber, said body having a material inlet communicated to the mixing chamber;
   a floating weight movable between lifted and lowered positions and operable to load the material into the mixing chamber as it moves from the lifted position towards the lowered position, said floating weight when in the lowered position closing the material inlet;
   a fluid-operated cylinder assembly having a piston rod carrying said floating weight;
   a support structure for supporting the fluid-operated cylinder assembly for movement between operative and stand-by positions in a direction generally perpendicular to the longitudinal axis of said cylinder assembly only when the floating weight is in the lifted position, said cylinder assembly when in the operative position being positioned immediately above the material inlet, but when the stand-by position, being positioned laterally offset with respect to the material inlet; and
   a drive mechanism for driving the cylinder assembly between the operative and stand-by positions one at a time.

2. A machine as claimed in claim 1, wherein the support structure includes an enclosure enclosing the cylinder assembly with the floating weight regardless of the position of said cylinder assembly and having an opening defined therein through which the material is adapted to be supplied, and further comprising a partition wall member for defining a chute leading from the opening to the material inlet only when the cylinder assembly is in the stand-by position with the floating weight held in the lifted position.

3. A machine as claimed in claim 2, wherein the partition wall member is movable between opened and closed position in a direction perpendicular to the direction of movement of the cylinder assembly, and further comprising a second drive mechanism for moving said partition wall member, said partition wall member when moved to the closed position defining the chute in cooperation with the enclosure.

4. A machine as claimed in claim 2, wherein said partition wall member is carried by the cylinder assembly for movement together therewith, said partition wall member when the cylinder assembly is moved to the stand-by position being separated from that portion of the enclosure where the opening is defined, thereby defining the chute.

* * * * *